United States Patent [19]

Sampson

[11] Patent Number: 5,518,278
[45] Date of Patent: May 21, 1996

[54] COUPLING

[76] Inventor: Gerald A. Sampson, 1029 Wardman Dr., Brea, Calif. 92621

[21] Appl. No.: 387,195

[22] Filed: Feb. 13, 1995

[51] Int. Cl.⁶ .................................................. F16L 37/18
[52] U.S. Cl. ................................................ 285/312; 285/320
[58] Field of Search ................................ 285/308, 309, 285/311, 312, 320, 205

[56] References Cited

U.S. PATENT DOCUMENTS

| | | | |
|---|---|---|---|
| 464,386 | 12/1891 | Patterson | 285/317 |
| 558,364 | 4/1896 | Doolittle | 285/320 |
| 592,899 | 11/1897 | Wilson | 285/317 |
| 796,220 | 8/1905 | Jones | 285/317 |
| 933,561 | 9/1909 | Herbert | 285/320 |
| 1,096,690 | 5/1914 | Derbyshire | 285/320 |
| 1,325,468 | 12/1919 | Foster | 285/320 |
| 2,099,335 | 11/1937 | Hansen | 285/320 |
| 3,268,249 | 8/1966 | Owens | 285/312 |
| 4,059,296 | 11/1977 | Panourgias | 285/312 |
| 4,557,261 | 12/1985 | Rügheimer | 285/320 |

FOREIGN PATENT DOCUMENTS

| | | | |
|---|---|---|---|
| 0134152 | 3/1985 | European Pat. Off. | 285/312 |
| 488981 | 7/1938 | United Kingdom | 285/320 |

*Primary Examiner*—Eric K. Nicholson
*Attorney, Agent, or Firm*—Edgar W. Averill, Jr.

[57] ABSTRACT

A coupling for holding a clamped piece such as a large hose in a ring shaped clamping piece. The clamped piece has an external annular groove near its end. The end of the hose is placed in a ring shaped clamping piece which has a pair of locking pieces pivotally mounted therein. The clamping pieces pivot about an axis which is parallel to the central axis of the hose to be clamped. The clamping pieces have a curved and beveled clamping surface which moves into the center of the ring shaped clamping piece as they are closed. The beveled part of these locking pieces move into the external annular groove at the end of the hose to securely hold the hose in the clamping piece.

9 Claims, 2 Drawing Sheets

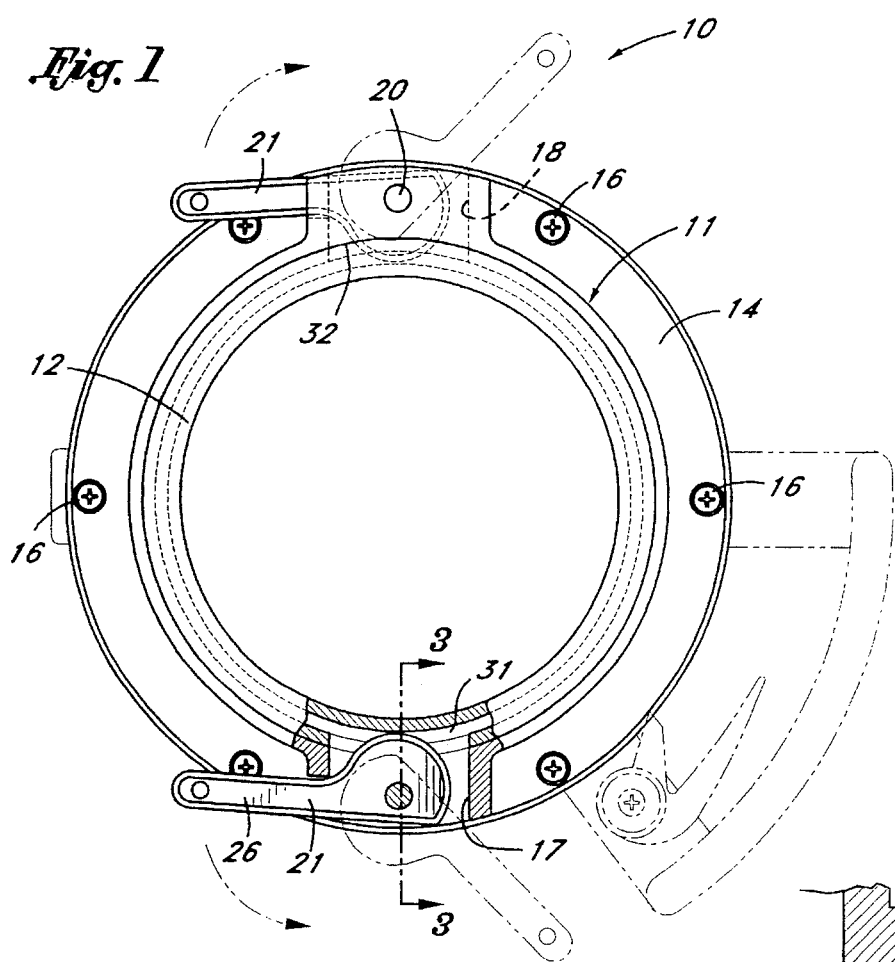
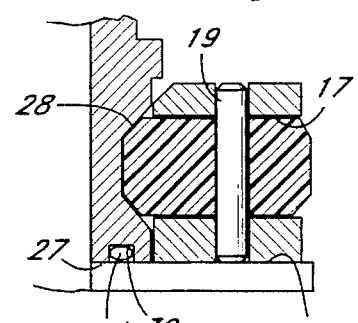
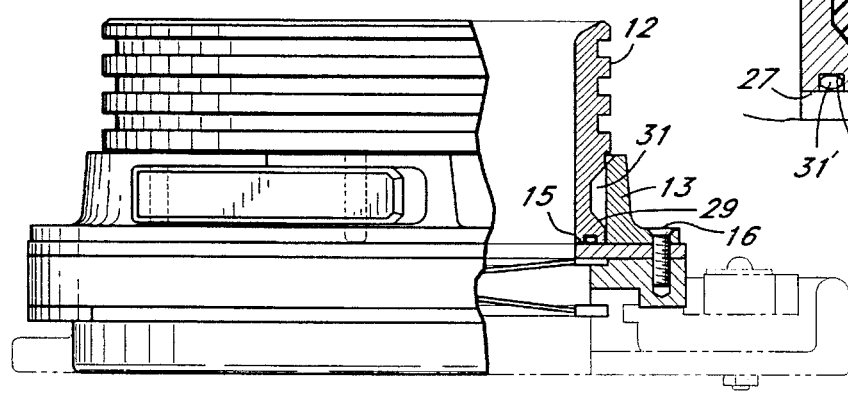

COUPLING

BACKGROUND OF THE INVENTION

The field of the invention is clamps and the invention relates more particularly to clamps for holding the end of a cylindrical piece in a ring shaped piece.

Couplings for holding two lengths of hose together are, of course, very common. One such device is shown in Doolittle U.S. Pat. No. 484,656. This clamp has a camming surface which is formed about the pivot point of the locking handle to force the end of one hose into secure contact with the end of the other hose. Another similar design of coupling is shown in Clark U.S. Pat. No. 2,069,216. This clamp likewise has a camming surface formed circularly about the pivot point of the locking handle. Baxter U.S. Pat. No. 2,122,633 shows a clamp which pivots over a flat surface to be clamped. The coupling of U.S. Pat. No. 2,478,586 shows a pair of locking handles in a coupling which pivot about an axis at a right angle to the longitudinal axis of the hose being clamped.

BRIEF SUMMARY OF THE INVENTION

It is an object of the present invention to provide a coupling which securely locks the end of a clamped piece into a ring which is easy to operate and which securely holds the clamped piece in a holder.

BRIEF DESCRIPTION OF THE DRAWINGS

FIG. 1 is a plan view partially cut away of the clamping piece and the clamped piece of the present invention.

FIG. 2 is a front view partially cut away of the clamped piece and the clamping piece of FIG. 1.

FIG. 3 is an enlarged cross-sectional view taken along line 3—3 of FIG. 1.

DESCRIPTION OF THE PREFERRED EMBODIMENTS

Figure 4:
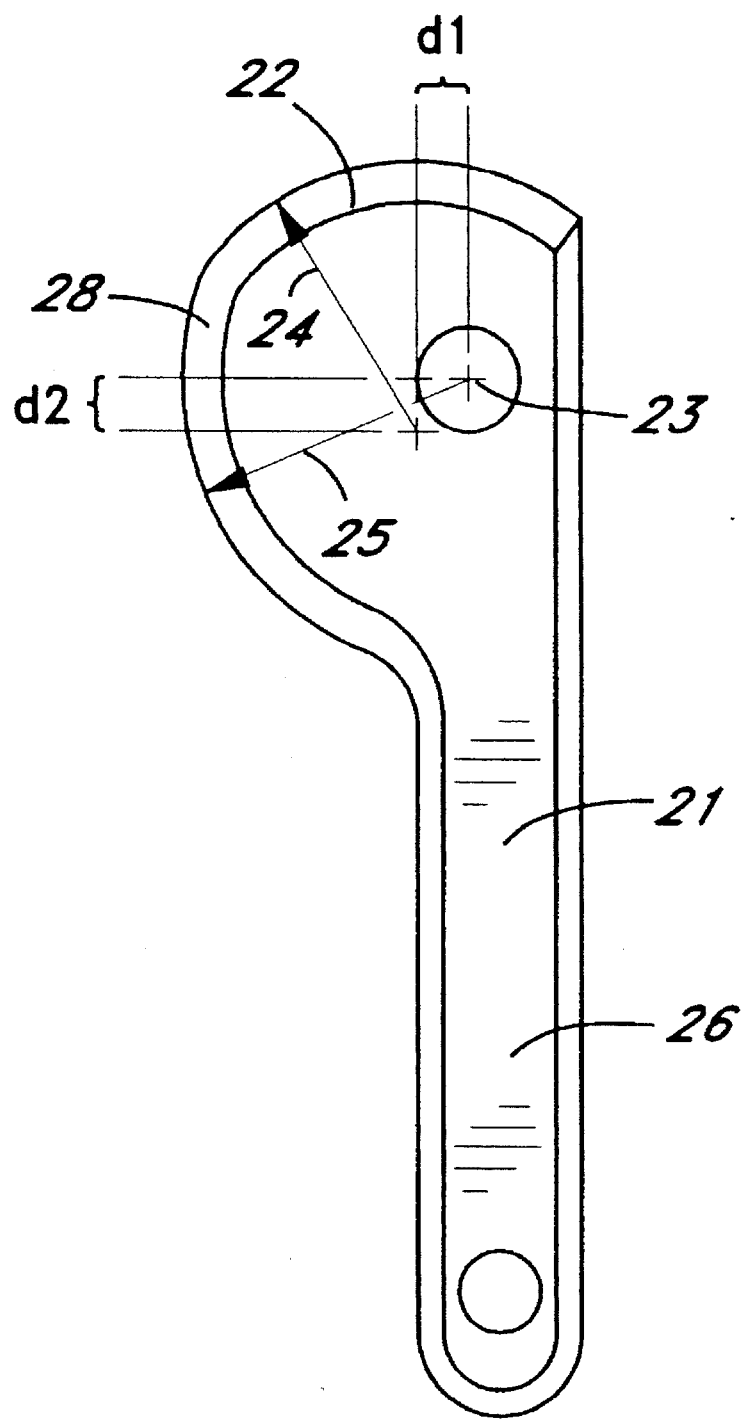
FIG. 4 is an enlarged plan view of one of the locking handles of the clamping piece of FIG. 1.

The coupling device of the present invention is shown in top view in FIG. 1 and indicated generally by reference character 10. Coupling device 10 basically consists of a holder generally indicated by reference character 11 and a clamped piece 12. Holder 11 has a vertical wall portion 13 shown best in FIG. 2 and a flange portion 14 which is affixed to a flat floor 15 by a series of screws 16. Vertical wall portion 13 has two openings 17 and 18, each of which contain a vertical pin 19 and 20 which support locking handles 21 in a pivotal manner. Locking handles 21 are shown in a closed position in FIG. 1 and in an open position in a phantom view in FIG. 1. Both locking handles are identical except that the opposite faces are shown in FIG. 1. The locking handle is shown in FIG. 4 and will be described in more detail below.

The locking handle has a curved and beveled clamping surface 22 which has two different radius of curvatures. As shown in FIG. 4, the curved portions can be indicated best by picturing the face of a clock with its center at the vertical pivot axis 23 of FIG. 4. A first curve has a radius indicated by reference character 24 and this curve passes from a one o'clock position counter clockwise to a ten o'clock position. From a ten o'clock position to a six o'clock position, a second radius of curvature 25 exists. The first radius of curvature 24 has a center point, a distance d1 to the left of vertical pivot axis 23, and a distance d2 below vertical pivot axis 23. In this way as the locking handle is turned clockwise about axis 23 as shown in FIG. 4, the curved and beveled surface moves upwardly as viewed directly above vertical pivot axis 23. It has moved to a maximum upward position when the handle portion 26 has been turned about 90°. After that, the second radius of curvature 25 retains the upward movement as shown in FIG. 4 at a constant amount so that the handle can be turned fully out of the way without undue binding.

Thus, as shown in FIG. 1, when both of the handles 21 are turned to the position shown in phantom view, the clamped piece 12 can be removed or inserted. After it is inserted so that its flat base 27 (shown in FIG. 3) is in contact with flat floor 15, the two handles are moved to the position shown in FIG. 1 in a fully clamped position. The lower portion of the bevel 28 contacts an angled bottom 29 shown best in FIG. 2 which contacts the bevel 28 of locking handle 21 and tends to push the clamped piece downwardly into firm contact with flat floor 15. Preferably flat base 27 of clamped piece 12 has an o-ring groove 30 with an o-ring 31 which provides a cushioned and airtight clamping surface against flat floor 15.

The result is a simple and intuitive to use clamping arrangement. Preferably, the locking handles are fabricated from a polymer such as nylon that has a relatively low coefficient of friction combined with high strength to provide a firm clamping action. Furthermore, the locking handle 31 is securely held in opening 17 since it contacts both the upper and lower surface of the opening as well as contacting the locking pin. In this way, the locking handle is very firmly supported in the horizontal groove 31. As shown in FIG. 3, bevel 28 is preferably formed at about a 45° angle, although other angles could, of course, be used. The locking handle 21 is preferably beveled at both the top and the bottom and the horizontal groove 31 is also preferably beveled in the same shape to provide an especially secure coupling action. While two locking handles are shown in FIG. 1, the clamping action could still be provided with a single locking handle and more than two, such as three or four, would, of course, provide a more secure coupling action. It is important, however, that the clamped piece 12 be supported in such a way that it will resist moving away from the locking handle as it is turned. Thus, it is necessary that the holder 11 have an opposed wall 32 opposite the lower locking handle 21 of FIG. 1 and that the clamped piece 12 have a remote edge 33 which contacts the opposed wall 32 providing a secure support against movement away from the lower locking handle 21. Preferably, and most commonly, both the holder and the clamped piece will be cylindrical in shape and provide a slightly loose fit until clamped, at which point the bottom or flat base 27 is pushed against flat floor 15. These floors could, of course, be angled rather than flat.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A coupling for holding a clamped piece within a clamping piece comprising:

a clamped piece having a body having a groove having a central axis which is horizontal, said groove being a horizontal groove, said horizontal groove having an angled bottom edge and said body of said clamped piece having a remote edge opposed to a clamped portion of said horizontal groove;

a clamping piece having a first wall and an opposed wall, said first wall having an inner surface positioned adjacent said clamped piece and an opening therein adjacent said clamped piece and said clamping piece being positioned so that the horizontal groove of said clamped piece is adjacent said opening and said opposed wall is adjacent said remote edge; and a locking handle horizontally movable and pivotally mounted about a vertical pivot axis in aid opening in said first wall of said clamping piece, said locking handle having a curved and beveled clamping surface, the clamping surface being shaped so that as said locking handle pivots in said opening from an opened position to a closed position, the clamping surface of said locking handle moves inwardly into said horizontal groove and said locking handle having a handle portion extending outwardly from said clamping piece when said locking handle is in an open position and wherein said curved and beveled clamping surface of said locking handle has two distinct curves, described as viewed from above along said vertical pivot axis and the handle is in a six o'clock position, a first distinct curve extends from a one o'clock position counterclockwise to a ten o'clock position and centered to the left and below said pivot axis and a second distinct curve starting at the end of said first distinct curve and centered about said vertical pivot axis and continuing to about a six o'clock position to an intersection with said handle portion.

2. The coupling of claim 1 wherein said clamped piece has a cylindrical outer surface at the place where said horizontal groove is located and said clamping piece has a pair of opposed locking handles.

3. The coupling of claim 2 wherein said clamped piece has a flat base and said clamping piece has a flat floor portion adjacent said flat base.

4. The coupling of claim 3 wherein said clamped piece has an O-ring groove and with an O-ring positioned therein and extending therefrom to provide a cushioned contact surface.

5. The coupling of claim 1 wherein said beveled clamping surface is beveled at about a forty-five degree angle and wherein the angled bottom edge of said horizontal groove has an angle of about forty-five degrees with respect to the vertical.

6. A coupling for holding the end of a conduit in a circular base, said coupling comprising:

a conduit having a central passageway with a circular cross-section, said, conduit having a central conduit axis, an internal surface and an external surface, and an end with an external annular groove in said external surface positioned inwardly from and parallel to the end, said external annular groove having an inner edge and an outer edge and said outer edge being a beveled edge;

a ring shaped clamping piece surrounding the end of said conduit having a clamping piece central axis parallel to the conduit central axis, an external surface and an internal surface which is slightly larger than the external surface of said conduit, said ring shaped clamping piece having an entrance end and an exit end and having a pair of opposed openings passing from the internal surface to the external surface, each of said openings having a pivot pin positioned parallel to the clamping piece central axis;

a pair of locking pieces pivotally supported on said pivot pins of said clamping piece, each of said locking pieces having a handle positioned externally of said clamping piece and said locking pieces each having a curved and beveled clamping surface which is shaped so that it moves from within said internal surface of said clamping piece when a locking piece is pivoted to a maximum open position and moves into said external annular groove as the locking piece is pivoted into a closed position and contacts both the inner edge and the outer edge of said external annular groove; and means for positioning said groove adjacent said locking pieces.

7. The coupling of claim 6 wherein said means for positioning said groove against said locking pieces comprises a flange positioned in said clamping piece adjacent the exit end thereof and said end of said conduit is a flat end and said external annular groove is positioned inwardly from said flat end so that the groove is adjacent said locking pieces when said flat end is in contact with said flange.

8. The coupling of claim 7 wherein said flat end of said coupling has an O-ring groove containing an O-ring to provide a cushioned seal as the locking pieces are passed into a closed position.

9. The coupling of claim 6 wherein said locking handle is fabricated from nylon.

* * * * *